United States Patent
Keyl et al.

(10) Patent No.: US 9,956,693 B2
(45) Date of Patent: May 1, 2018

(54) METHOD AND DEVICE FOR DECELERATING A ROBOT AXIS ARRANGEMENT

(71) Applicant: KUKA Laboratories GmbH, Augsburg (DE)

(72) Inventors: Hartmut Keyl, Augsburg (DE);
Michael Thummel, Augsburg (DE);
Dietmar Tscharnuter, Friedberg (DE);
Tobias Weiser, Gunzburg (DE)

(73) Assignee: KUKA Deutschland GmbH, Augsburg (DE)

( * ) Notice: Subject to any disclaimer, the term of this patent is extended or adjusted under 35 U.S.C. 154(b) by 55 days.

(21) Appl. No.: 14/339,093

(22) Filed: Jul. 23, 2014

(65) Prior Publication Data
US 2015/0032263 A1 Jan. 29, 2015

(30) Foreign Application Priority Data

Jul. 26, 2013 (DE) .......................... 10 2013 012 448

(51) Int. Cl.
*B25J 19/00* (2006.01)
*B25J 9/16* (2006.01)

(52) U.S. Cl.
CPC ......... *B25J 19/0004* (2013.01); *B25J 9/1674* (2013.01); *G05B 2219/41279* (2013.01); *G05B 2219/41285* (2013.01); *G05B 2219/42284* (2013.01)

(58) Field of Classification Search
CPC ............... B25J 9/1674; B25J 19/0004; G05B 2219/41279; G05B 2219/41285; G05B 2219/42284

USPC .......................................................... 700/261
See application file for complete search history.

(56) References Cited

U.S. PATENT DOCUMENTS

| 4,015,721 A | 4/1977 | Scheler |
| 8,751,040 B2* | 6/2014 | Wells ................... B25J 19/0004 700/245 |
| 2003/0141155 A1* | 7/2003 | Daneryd .............. B25J 19/0004 188/267.1 |
| 2010/0058850 A1* | 3/2010 | Ortmaier ................ B25J 13/085 73/121 |

(Continued)

FOREIGN PATENT DOCUMENTS

| CN | 102689307 A | 9/2012 |
| DE | 2442865 A1 | 3/1976 |

(Continued)

OTHER PUBLICATIONS

European Patent Office; Search Report in European Patent Application No. 14 00 2391 dated Jan. 30, 2015; 9 pages.

(Continued)

*Primary Examiner* — Khoi H Tran
*Assistant Examiner* — Robert T Nguyen
(74) *Attorney, Agent, or Firm* — Wood Herron & Evans LLP

(57) ABSTRACT

A method for decelerating a robot axis arrangement having at least one output link includes steps of applying a braking force on the output link with a brake and, in so doing, controlling a driving force of a drive that acts on the output link, and/or controlling the braking force on the basis of a dynamic variable of the output link, wherein the dynamic variable is a function of the braking force.

15 Claims, 2 Drawing Sheets

(56) References Cited

U.S. PATENT DOCUMENTS

2012/0150347 A1\* 6/2012 Ohga ................... B25J 9/1633
                                                                                                 700/254

FOREIGN PATENT DOCUMENTS

| DE | 10195708 T1 | 5/2003 |
|---|---|---|
| DE | 102008027754 A1 | 1/2009 |
| EP | 1 905552 A1 | 4/2008 |
| JP | H06262565 \* | 9/1994 |
| JP | H06262565 A | 9/1994 |
| JP | H10156771 A | 6/1998 |
| JP | 2009095939 A | 5/2009 |
| KR | 20110053450 A | 5/2011 |
| WO | 0162449 A1 | 8/2001 |
| WO | 2010025944 A1 | 3/2010 |

OTHER PUBLICATIONS

Minamiyama et al; Publication entitled "Positioning of Rotary Pneumatic Actuator by Passive Dynamic Control" dated Dec. 2012; 8 pages.
German Patent Office; Search Report in German Patent Application No. 10 2013 012 448.4 dated Dec. 9, 2013; 8 pages.
Korean Patent Office; Office Action in Korean Patent Application No. 2014-0093818 dated Jan. 25, 2016; 11 pages.
Chinese Patent Office; Office Action in Chinese Patent Application No. 201410364830.2 dated Nov. 3, 2016, 2016; 19 pages.
Chinese Patent Office; Office Action and Search Report in Chinese Patent Application No. 201410364830.2 dated Sep. 9, 2015; 20 pages.

\* cited by examiner

METHOD AND DEVICE FOR DECELERATING A ROBOT AXIS ARRANGEMENT

TECHNICAL FIELD

The present invention relates to a method for decelerating a robot axis arrangement as well as a robot axis arrangement and a computer program product for carrying out such a method.

BACKGROUND

Robots have a robot axis arrangement with one or more robot axes (of motion). These axes of motion of the robot are actuated by drives, in order to move the robot and to traverse a specified path, for example, with a robot-fixed reference point, such as the TCP ("tool center point"). In order to decelerate an axis, the drive applies an inverse driving torque in the normal operating mode.

In addition, a robot axis can have a brake in order to lock the immobilized axis when the drive is unpowered.

In the event of an operating exception, for example, an emergency stop, according to in-house practice, the drive is isolated from an energy supply, and at the same time this additional brake is quickly closed in order to stop the axis fast and reliably. In this respect, the structure of the robot and/or the brake, which is usually designed only for locking the immobilized axis, can be subjected to a high dynamic load. In addition or alternatively, the brakes can deviate in their effect, in particular due to manufacturing and/or assembly tolerances, and, in so doing, can result in a high load.

SUMMARY

It is the object of the present invention to improve the deceleration of a robot axis arrangement, in particular, up to a standstill.

According to one aspect of the present invention, a robot axis arrangement has a single robot axis or a plurality of axes, in particular, all of the robot axes of one or more robots, in particular, at least one six-axes or multi-axes industrial or light-weight robot.

A robot axis has an output link, which in one embodiment is connected permanently or releasably to a robot link in a rotationally rigid and/or axially rigid manner. In particular, the one robot link can be mounted on another robot link and/or can be moved against this additional robot link by means of the output link in such a way that said one robot link can be rotated and/or slid.

The robot axis has a drive for applying a driving force on the output link. The drive can have, in particular, one or more electric motors, which are, in particular, mechanically coupled in parallel or in series. In addition or alternatively, the drive can have a gear unit, in particular, a spur gear unit, preferably a planetary gear unit, and/or a sliding wedge drive gear unit, or a strain wave gear (SWG) with an elastic transmission element, in particular, a so-called harmonic drive gear unit. The output link can have, in particular, can be, in particular, the rotor or the stator of an electric motor of the drive or an output shaft, in particular, an outer ring, of a gear unit of the drive.

The robot axis has an additional brake for applying a braking force on the output link. The brake can have, in particular, can be, in particular, a holding brake for locking the output link. In one embodiment the brake is a brake, which is closed without power and which in normal operation is opened or vented by actively actuating, for example, supplying energy to at least one electromagnet. The brake can have, in particular, can be, in particular, an (electro) mechanical, hydraulic, or pneumatic brake. In one embodiment, the brake has a spring element for tightening two brake members relative to each other and an actuator, in particular, an electromagnetic and/or motor-driven actuator, for spacing the brake members apart from each other and/or for actively venting the brake. In one embodiment the brake is disposed between the drive motor and the drive gear unit; in another embodiment the brake is disposed on a side of a drive motor that faces away from the gear unit or on a side of the drive gear unit that faces away from the motor.

According to one aspect of the present invention, the robot axis arrangement has a control means for controlling the driving force and/or the braking force of a single axis or of a plurality of axes, in particular, all of the axes of the robot axis arrangement.

A means, as defined for the purpose of the present invention, can be designed as hardware and/or software, in particular, a processing unit, preferably connected to a memory system and/or a bus system by means of data and/or signals, in particular, a digital processing unit, in particular, a microprocessor unit (CPU), and/or can have one or more programs or program modules. For this purpose, the CPU can be configured to execute commands, which are implemented as a program stored in a memory system, to acquire input signals from a databus, and/or to send output signals to a databus. A memory system can have one or more, in particular, different, storage media, in particular, optical, magnetic, solid state, and/or other non-volatile media. The program can be configured in such a way that it embodies or is capable of executing the method described herein, so that the CPU can carry out the steps of such a method and, as a result, can control, in particular, the axis drive(s) and/or the brake(s).

The control means can be, in particular, a robot control unit of the robot with the axes of the robot axis arrangement. Similarly, the control means can be designed for controlling the driving force and/or the braking force of just a single axis and can be disposed in a robot link, in which the drive and/or the brake is disposed. This arrangement eliminates long communication paths, and the control process for avoiding or reducing high loads can be carried out axis-by-axis and directly.

The term "to control" is understood to mean for the purpose of the present invention, in particular, to command and/or to actuate exclusively on the basis of a specified one dimensional or multi-dimensional variable ("feedforward control"). In a preferred embodiment, the term "to control" can also be construed for the purpose of the present invention to be, in particular, a closed loop control, i.e., to command and/or to actuate on the basis of a comparison of a specified one dimensional or multi-dimensional variable with a determined actual variable ("feedback control"). In this case both are generally referred to herein as "to control" for the sake of a more concise presentation.

According to one aspect of the present invention, a braking force is applied on one or more output links by means of the brake(s) acting on this output link or on these output links, in order to decelerate the robot axis arrangement, in particular, by means of the control means. The braking force can be applied, in particular, on the moved output link, in order to decelerate, in particular, to stop said output link. In one embodiment, the braking force is applied on the basis of an operating exception. An operating exception, as defined by the present invention, can be, in particular, a state which deviates from a normal operating mode, in particular, from moving along a predetermined working path, in particular, an unscheduled stop, for example, as a result of an emergency stop, a safety monitoring operation, or the like.

Hence, in one embodiment, an additional brake, in particular, a holding brake for decelerating, in particular, stopping, at least one axis of a robot is closed, for example, due to an emergency stop.

In particular, in such a situation the structure of the robot and/or the brake(s), in particular, a bearing and/or an attachment can be subjected to a high dynamic load: if the brake is applied, then the output link is loaded for a short time with the full inertia of the axis, in particular, a solid robot link, which moves at a high speed, and/or additional robot links that are connected to said solid robot link. A braking effect can thereby spread over a relatively large range in particular due to the manufacturing and/or assembly tolerances, so that very high loads can occur at the individual brakes.

According to one aspect of the present invention, when the brake is closed and/or when one or more axes and/or output links are decelerated by means of the respective additional brake, in particular, during the entire braking action up to a standstill of the axis or at least section by section during the braking action, the driving force of the respective drive acting on the output link is controlled on the basis of a dynamic variable of the output link, which dynamic variable is a function of the braking force. In a further development, the driving force is also additionally controlled, before and/or after the deceleration of the axis (axes) or the output links, by means of the respective additional brake and/or additionally, even if the brake has not been opened yet or has already been opened again, in particular, due to inertia or an error, on the basis of a dynamic variable of the output link, which variable is a function of the braking force.

In one embodiment, the drive is controlled in an accelerating manner, at least section by section during the braking action, in the opposite direction of the brake and/or the axis, in order to reduce a time delay and, in so doing, a load on the structure and/or the brake, i.e., in order to work against the braking effect. Since the driving force and the braking force have an accumulative effect in the output link, the total load can be correspondingly reduced by this means. In an additional embodiment, the drive is delay controlled, at least section by section during the braking action, in the same direction of the brake and/or the axis, in order to likewise exert a braking effect and, in so doing, to reduce the load on the brake. In a further development, these two embodiments can be combined, or, during at least one section of the braking action, the drive can be controlled in the opposite direction of the brake, and in at least one section of the braking action that is different from the former section and/or is spaced apart from said former section in terms of time, said drive can be controlled in the same direction of the brake. By this means, in one embodiment, in particular, in one section, in which the brake exerts a high braking force as a consequence of heating up and, thus, in particular, subjects the robot to a load, braking effect thereof and, thus the load can be reduced, and, in another section, in which the brake, which is still cold, for example, exerts a negligible braking force and thus increases, in particular, the braking path, said brake intensifies the braking effect and, in so doing, shortens the braking path. Similarly an additional embodiment provides that the drive acts only in the same direction of the brake and/or provides an intensification of the braking force, in particular, in order to avoid excessive wear on the brake by a drive that acts in the opposite direction and/or due to a longer braking path.

Controlling the driving force can be advantageous, in particular if the brake is a binary brake that can be switched only between an open and a closed state, without being able to specify its braking force in between.

In addition or alternatively to controlling the driving force, one embodiment provides that, in particular, during the entire braking action up to a standstill of the axis or at least section by section during the braking action, the braking force of the respective brake, acting on the output link, is controlled on the basis of a dynamic variable of the output link, which variable is a function of the braking force, in particular, said braking force is controlled on the basis of the same dynamic variable, on the basis of which the driving force is also controlled. Hence, in one embodiment, the braking force can be delimited or, at least reduced in phases, in order to reduce a load on the structure and/or the brake.

By suitably controlling the driving force and/or the braking force, it is possible, in one embodiment, to reduce a time delay of the robot axis, in particular, a maximum delay of the robot axis. In particular, when fast moving axes are brought to a stop, such an effect can reduce the load on the structure and/or the brake. In addition or alternatively, a braking action can be split between the drive and the brake; and, in so doing, the load on the brake itself can be reduced.

In one embodiment, the one dimensional or multi-dimensional dynamic variable can have, in particular, can be a force that acts on or in the output link or is exerted by this output link. A force, as defined in one embodiment for the purpose of the present invention, can also have, in particular, can be an anti-parallel force pair, i.e., a torque, which for the purpose of a more concise presentation is generally referred to herein as the force.

By controlling a driving force and/or a braking force on the basis of a force of the output link, this force and, as a result, also a load on the structure of the robot and/or the brake can be reduced.

In addition or alternatively, the dynamic variable can have, in particular, can be a one dimensional or multi-dimensional movement variable of the output link, in particular, a speed $\bar{\omega}(t)$, an acceleration $d\bar{\omega}/dt$, a jerk $d^2\bar{\omega}/dt^2$ and/or a higher time derivation. A load during deceleration by means of the brake is a function of a time delay, in particular, of the speed variation and/or a resulting jerk and/or the changes in acceleration. By this means, in particular, on the basis of a model, and also by determining a movement variable, a load can be estimated, or a load can be reduced by controlling on the basis of the movement variable.

In one embodiment, the driving force and/or the braking force is controlled on the basis of a difference between the dynamic variable and a specified limit value, in particular, in such a way that, in particular, in terms of amount, exceeding this limit value is avoided, truncated, and/or reduced. In a further development, the one dimensional or multi-dimensional limit value can comprise, in particular, can be a specified maximum load, in particular, a maximum force, in particular, a maximum torque of the output link. Then, in one embodiment, the drive and/or the brake can be controlled in such a manner that a real load or an actual load does not exceed this maximum load during the braking action, exceeds this maximum load for only a short time or exceeds this maximum load as little as possible. In one embodiment, a maximum torque can be a maximum of 1,000 Nm, in particular, 600 Nm, preferably a maximum of 100 Nm, in particular, for a light-weight robot. In particular, for an industrial robot, a maximum torque in one embodiment can be a maximum of 50,000 Nm, in particular, a maximum of 10,000 Nm.

In addition or alternatively, the limit value can comprise, in particular, can be a specified one dimensional or multi-dimensional maximum movement variable, in particular, the acceleration of the output link. Then, in one embodiment, the drive and/or the brake can be controlled in such a way that a real movement variable or an actual movement variable does not exceed this maximum load in terms of amount during the braking action exceeds this maximum value for only a short time, or exceeds this movement variable as little as possible.

The limit value can be specified in such a manner that it is fixed, adjustable, or variable. In one embodiment, the limit value comprises a force, which is supposed to act on or in the output link or which is supposed to be exerted by this output link, in particular, a target braking torque. Hence, for the sake of a more concise presentation, a target value that is to be reached is also referred to herein as the limit value.

In a further development, the limit value is specified on the basis of a movement variable of the output link, in particular, a difference between a target movement variable and an actual movement variable of the output link. In particular, a speed controller can specify a target braking torque, in order to reach a target speed, in particular, to reduce the speed to zero, preferably to initiate a braking ramp. The driving force and/or the braking force is controlled on the basis of the difference between the limit value, in particular, this target braking torque, and a force, which acts on or in the output link or which is exerted by this output link.

In one embodiment, a driving force and/or a braking force can be controlled in proportion to a difference between the dynamic variable and a specified limit value and/or a time derivation and/or a time integral of this difference, in particular, therefore, by means of a proportional, integral and/or differential controller. In addition or alternatively, the driving force and/or the braking force can be controlled on the basis of a model of the robot axis arrangement. Thus, in one embodiment, it is possible to consider the dynamics of the robot axis arrangement, in particular, its inertia.

In one embodiment the dynamic variable is determined with a fail-safe technology, in particular, through redundancy, preferably diversity. In addition or alternatively, the driving force and/or the braking force can be controlled with a fail-safe technology, or at least control variables for controlling the driving force and/or the braking force, in particular, target values and/or set values can be determined with a fail-safe technology. Whereas the control process of the driving force and/or the braking force in fail-safe technology assumes fail-safe drives and/or brakes, a fail-safe monitoring can be implemented in an advantageous way with a minimum of effort by means of the control variables that are determined with fail-safe technology. Preferably, the driving force and/or the braking force is controlled at a frequency of at least 100 Hz, preferably at least 1 kHz, preferred at least 10 kHz, in order to adjust the load on the structure and/or brake(s) at an early stage.

In particular, the braking force and the driving force can be controlled in parallel branches or through parallel channels, so that in the event that one branch or one channel fails, the other branch or the other channel can continue to slow down, in particular, stop the robot axis or axes. Inversely, the brake alone can slow down, in particular, stop the robot axis or axes, in the event that the drive fails or is defective.

In one embodiment, the drive and/or the brake can be monitored with fail-safe technology, in particular, a force, which is exerted by the drive and/or the brake, and/or a movement variable, in particular, the speed of the output link. This monitoring operation can comprise, in particular, forming a differential value between a force, which is exerted by the drive and/or the brake, and/or the movement variable of the output link with an expected value, in particular, a specified limit value, and a comparison of this differential value with a threshold value. If this threshold value is exceeded, then one embodiment provides that one of the two parallel actuators for stopping the axis, is switched without power. This procedure can be carried out, in particular, by venting the brake or by disconnecting the energy supply to the drive.

In one embodiment, the robot axis arrangement has detection means for detecting the dynamic variable of one or more output links. The detection means can have, in particular, can be, in particular, a force sensor, preferably a torque sensor, which, in one embodiment, is operatively connected to the output link, in particular, is mounted on said output link. In addition or alternatively, the detection means can have, in particular, can be, in particular, a joint position sensor and/or a speed sensor and/or an acceleration sensor, preferably an angle of rotation sensor, which, in one embodiment, is operatively connected to the output link, in particular, is mounted on said output link.

In one embodiment, the detection means is disposed on the output side, in particular, on a side of a gear unit of the drive that faces away from the motor and/or on a side of the brake that faces away from the motor and/or the gear unit, in particular, the detection means is disposed between the output link and a robot link, for example, a robot link arm or robot hand, which is moved by this output link.

Additional advantages and features will be apparent from the dependent claims and the embodiments. For this purpose, the drawings show to some extent in schematic form the following.

DETAILED DESCRIPTION

Figure 1:
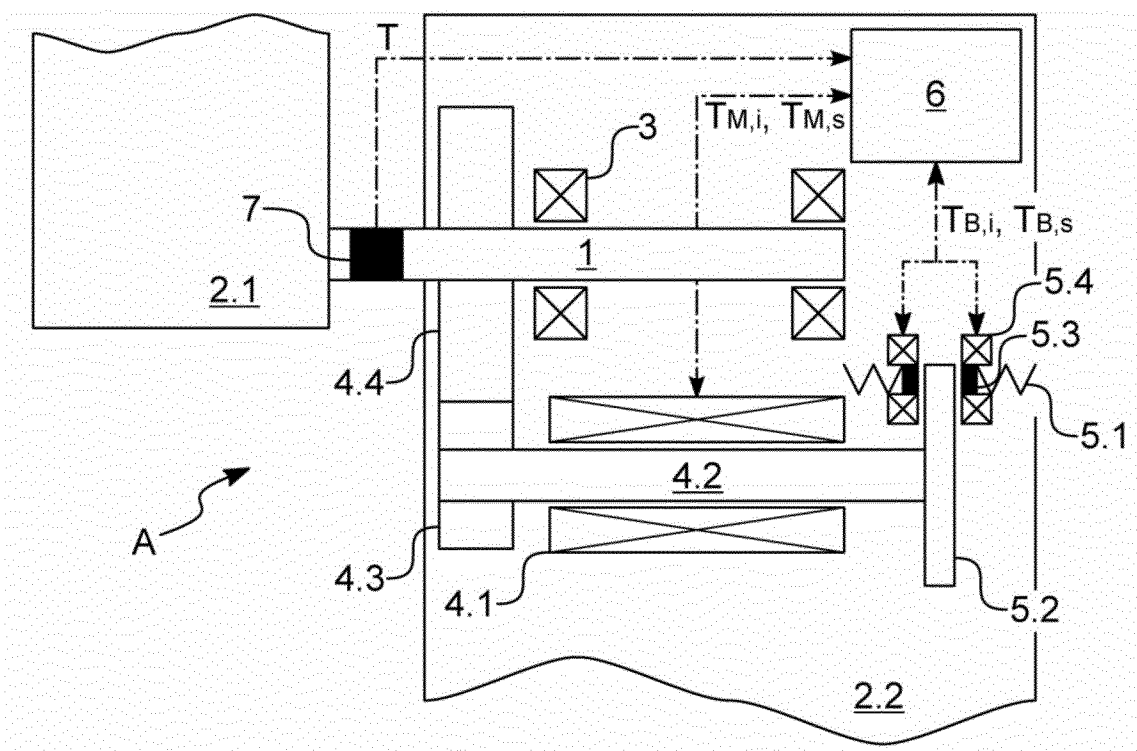
FIG. 1: a portion of a robot axis arrangement according to one embodiment of the present invention.

FIG. 1 shows an axis A of a robot axis arrangement according to one embodiment of the present invention. The axis can be, for example, a base axis or an arm axis of a six-axis or multi-axis industrial or light-weight robot. Other axis of the robot, which are otherwise not shown, can be constructed and decelerated in the same way, as described below with reference to the axis A, described herein.

The robot axis has an output link in the form of an output shaft 1 of a gear unit 4.3, 4.4 of an axis drive, which output shaft is connected in a rotationally and axially rigid manner to the robot link 2.1, which is pivot-mounted on an additional robot link 2.2 by means of the output shaft by way of the bearing 3.

In order to apply a driving force on the output shaft, an electric motor is provided having a stator 4.1 and a rotor 4.2, which is coupled to the output shaft 1 by means of the gears 4.3, 4.4 of the gear unit.

In order to apply a braking force on the output shaft, an additional brake having a spring element 5.1, for tightening a rotor-fixed braking member in the form of a brake disk 5.2 and a multi-part braking member in the form of brake pads 5.3 against each other, and an electromagnetic actuator 5.4 for spacing the braking members 5.2, 5.3 apart from each other and/or for an actively controlled venting of the brake, is disposed on the side (to the right in FIG. 1) of the drive motor 4.1, 4.2 that faces away from the gear unit.

In one modification (not shown) the brake can be disposed between the drive motor and the gear unit or on a side of the drive gear unit (to the left in FIG. 1) that faces away from the motor. In addition or alternatively, the gear unit can be designed as a harmonic drive gear unit.

The brake is designed as a holding brake for locking the output shaft 1 as a brake, which is closed without power and which is opened and/or vented by supplying energy to the electromagnets 5.4 in the normal operating mode.

A control means for controlling the driving force and/or the braking force of the axis A of the robot is implemented in an axis control unit 6, which is disposed in the additional robot link 2.2, in which the drive and the brake are disposed.

A detection means in the form of a torque sensor 7 for detecting a dynamic variable in the form of a torque T is disposed between the robot link 2.1 and the output shaft 1, is mounted on said output shaft and is signal-connected to the axis control unit 6. Both the torque determination and the control of the drive and the brake by means of the axis control unit are designed in fail-safe technology, in particular, through redundancy, preferably diversity.

Figure 2:
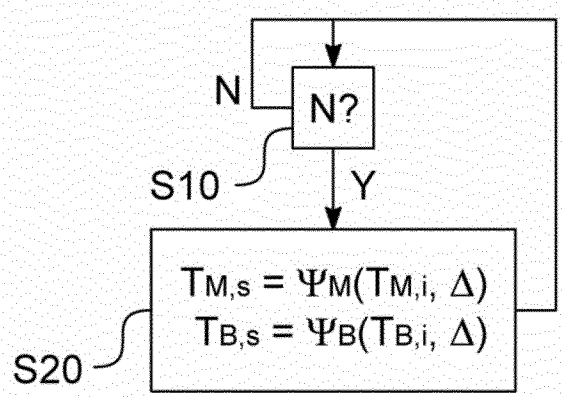
FIG. 2: a method for decelerating the robot axis arrangement from FIG. 1 according to one embodiment of the present invention.

FIG. 2 shows a method for decelerating the robot axis arrangement from FIG. 1 according to one embodiment of the present invention, in particular, how this method is carried out by means of the control means in the form of the axis control unit 6.

In a step S10, the axis control unit 6 controls the actuator 5.4 of the brake on the basis of an operating exception, for example, an emergency stop N, in order to apply a braking torque $T_{B,s}$. As a result, the additional holding brake for stopping the axis A as a consequence of an emergency stop (S10: "Y") is closed.

In particular, in such a situation, the structure of the robot and/or the brake can be subjected to a high dynamic load: as soon as the brake closes, the output shaft 1 is loaded for a short time with the full inertia of the axis A, in particular, the full inertia of the robot link 2.1, which is moving at a high speed.

Therefore, in a step S20, when the brake is closed, in particular, during the entire deceleration up to a standstill of the axis A, the target driving torque $T_{M,s}$ of the electric motor 4.1, 4.2 is specified on the basis of the torque T, which acts in the output shaft 1 and is determined by the torque sensor 7, which torque in turn is a function of the current actual braking force $T_{B,i}$.

In one embodiment, the target driving torque $T_{M,s}$ is specified, for example, in proportion to a difference $\Delta = T_{max} - |T|$ between the torque T and a specified limit value $T_{max}$:

$$T_{M,s} = \psi_M(T_{M,i}, \Delta)$$

with the current actual driving torque $T_{M,i}$ and with a function $\psi_M$, which is stored in the axis control unit 6, which function $\psi_M$, upon exceeding the limit value $T_{max}$, i.e., $\Delta<0$, applies a driving torque, which acts in the opposite direction of the brake and counteracts the delay of the axis A. By this means, the deceleration is delayed and thus the load is reduced. In other words, the electric motor 4.1, 4.2 compensates for a portion of the braking torque of the closed brake 5.1-5.4 and thus reduces the delay of the axis A and, thereby, in particular, the load on the output shaft 1. This can be every advantageous, in particular if the brake can only be opened and closed completely without being able to specify the braking force in between.

If, on the other hand, the braking force can be controlled, then in addition or alternatively, the axis control unit 6 can also correspondingly control the brake, for example, in accordance with a function $\psi_B$, which is stored in the axis control unit 6 and which, on exceeding the limit value $T_{max}$, i.e., $\Delta<0$ reduces the braking torque. By this means, the deceleration is likewise delayed and, thus, the load is reduced.

$$T_{B,s} = \psi_B(T_{B,i}, \Delta)$$

The functions $\psi_M$, $\psi_B$ can include a model, in particular, a dynamic model of the robot axis arrangement, in order to consider the dynamics of the robot axis arrangement, in particular, its inertia. The actual driving torque $T_{M,i}$ and/or the actual braking torque $T_{B,i}$ can be measured, for example, or can be estimated by an observer. In an additional embodiment, it can also remain unconsidered, i.e., $T_{M,s}=\psi_M(\Delta)$ and/or $T_{B,s}=\psi_B(\Delta)$.

The braking force and the driving force $T_{B,i}$, $T_{M,i}$ have an accumulative effect in the output shaft 1. The load on the output shaft 1, the bearings 3, etc. is reduced by adjusting downwards, at least in phases, the braking torque by means of the corresponding target values $T_{B,s}$ and/or by compensating to some extent by specifying the corresponding inverse target value $T_{M,s}$ for the drive:

$$T = T_{B,i} + T_{M,i} \approx T_{B,s} + T_{M,s}$$

A very simple function $\psi_B$ can implement, for example, a proportional control:

$$T_{B,s} = \begin{cases} T_{B,max} + K_p \cdot \Delta \Leftrightarrow \Delta < 0 \\ T_{B,max} \Leftrightarrow \Delta \geq 0 \end{cases},$$

with the proportional gain $K_p$ and the maximum braking torque $T_{B,max}$, which is applied, as long as the torque T, determined by the torque sensor 7, in the output shaft 1 does not exceed the limit value $T_{max}$. A very simple function $\psi_M$ can be formed in the same way, in order to reduce the entire torque T in the output shaft 1.

Figure 3:
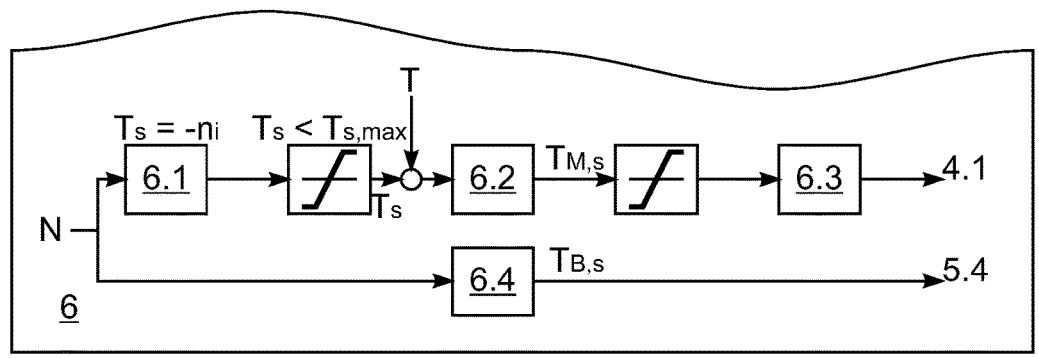
FIG. 3: a portion of a control means of the robot axis arrangement from FIG. 1 according to an additional embodiment of the present invention.

FIG. 3 shows a portion of a control means of the robot axis arrangement from FIG. 1 according to a modification of the above described embodiment.

In this modification, the control means 6 has a speed controller 6.1, which in the event of an emergency stop N determines a target braking torque $T_s$ (for example, in proportion to the actual speed to be reduced ($T_s=-K_p$ ni) and limited to a maximum amount ($T_s<T_{s,max}$)) from the difference between the target and the actual speed $n_i$ of the output shaft 1 and supplies said target braking torque to a torque controller 6.2. The torque controller 6.2 compares the actual torque T, detected by the torque sensor 7, in the output shaft with this target braking torque $T_s$ and provides a corresponding target current value, after limiting to a maximum value, to a current controller 6.3, which in turn supplies the stator 4.1 of the electric motor.

In parallel to this branch, the control means 6 has a brake control unit 6.4, which closes the brake 5.1-5.4 in the event that an emergency stop N has been detected.

Figure 4A:
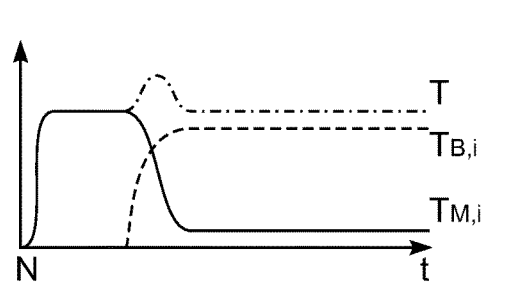
FIGS. 4A, 4B, 4C: progressions of a torque in the robot axis arrangement from FIG. 1.
Figure 4B:
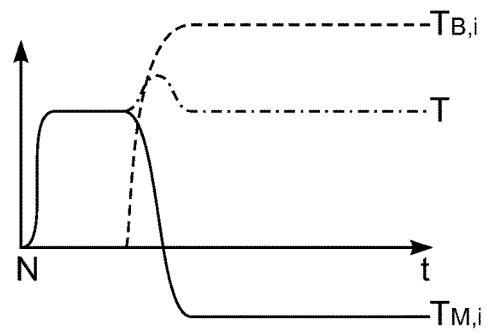
Figure 4C:
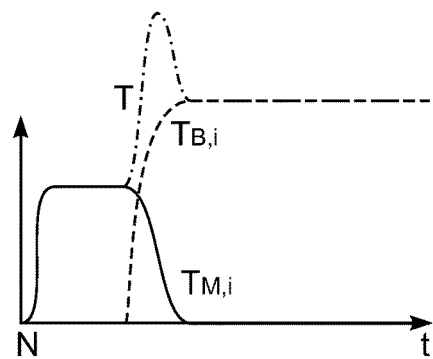
Figure 3:
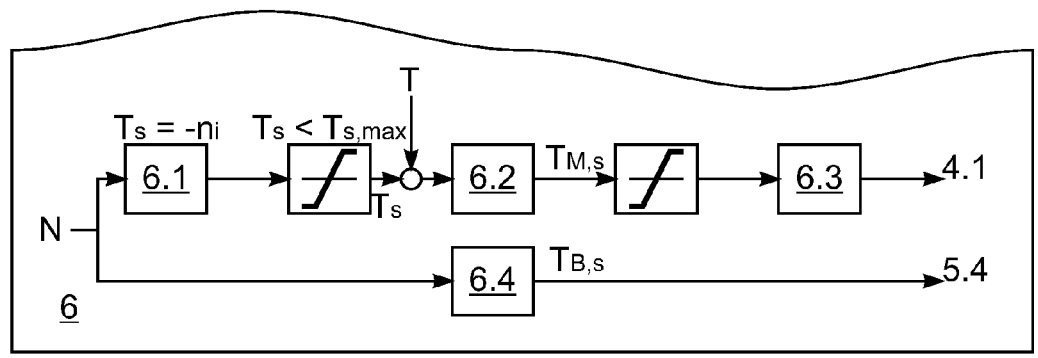
Figure 4A:
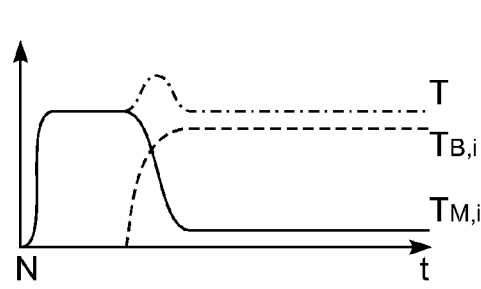
Figure 4B:
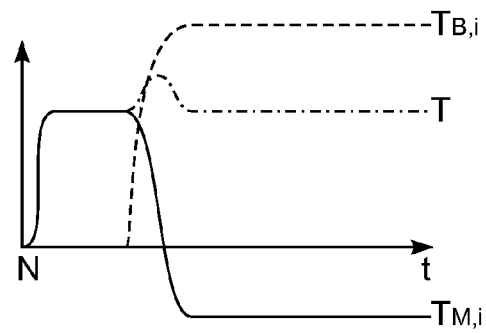
Figure 4C:
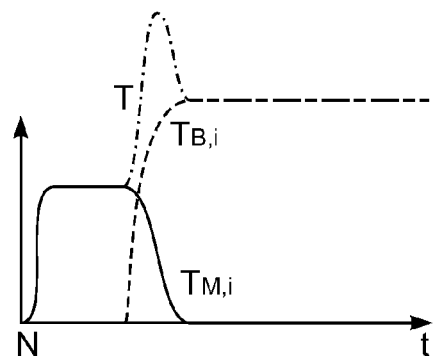

FIGS. 4A to 4C show temporal progressions of the torque T (dashed-dotted line in FIG. 4) as well as the actual torques $T_{M,i}$ (solid line in FIG. 4) and $T_{B,i}$ (dashed line in FIG. 4) of the electric motor and/or the brake in the robot axis arrangement from FIG. 1, as implemented by the control means 6 from FIG. 3. An emergency stop N is thereby initiated at time t=0 in each instance.

In the example shown in FIG. 4A, the speed controller 6 commands, on the basis of the difference between the actual speed and the target speed 0, a maximum target braking torque $T_{s,max}$, which the torque controller 6.2 endeavors to generate by means of a corresponding decelerating control of the electric motor. Correspondingly, the actual torque $T_{M,i}$ of the electric motor initially increases sharply.

With the inertia-induced delay, the brake control unit 6.4 also closes the brake 5.1-5.4, so that the actual torque $T_{B,i}$ of the brake also increases after a time delay. Due to the mechanical accumulative effect of both actual torques $T_{M,i}$ and $T_{B,i}$, a short term overshooting of the torque T occurs in the output shaft 1. This is detected by the torque sensor 7. The torque controller 6.2 correspondingly reduces the braking torque, which is applied by the electric motor, as a result, the brake substantially takes over the deceleration of the output shaft and is supported in this by the drive that acts in the same direction.

In the example shown in FIG. 4B, the applied brake exerts a stronger braking torque, which would lead to a long term exceeding of a permissible braking torque in the output shaft 1. Correspondingly, the torque controller 6.2 here applies a torque, using the electric motor, in the opposite direction of the torque of the brake.

In the example shown in FIG. 4C, the drive is allowed to act only in the same direction. Correspondingly, the torque controller 6.2 reduces the torque, which is to be generated by the electric motor, to zero.

While the present invention has been illustrated by the description of one or more embodiments thereof, and while the embodiments have been described in considerable detail, they are not intended to restrict or in any way limit the scope of the appended claims to such detail. The various features shown and discussed herein may be used alone or in combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicants' general inventive concept.

LIST OF REFERENCES

A robot axis
N emergency stop (operating exception)
1 output shaft (output link)
2.1, 2.2 robot link
3 bearing
4.1 stator
4.2 rotor
4.3, 4.4 gears (gear unit)
5.1 spring
5.2 brake disk (brake member)
5.3 brake pad (brake member)
5.4 electromagnet (actuator)
6 axis control unit (control means)
6.1 speed controller
6.2 torque controller
6.3 current controller
6.4 brake control unit
7 torque sensor (detection means)

What is claimed is:

1. A method for decelerating a robot axis arrangement comprising at least one output link, the method comprising:
applying a braking force on the output link with a brake during deceleration of the output link;
detecting a dynamic variable of the output link using a force sensor operatively connected to the output link; and
controlling at least one of the braking force or a driving force of a drive that acts on the output link on the basis of the dynamic variable of the output link and a dynamic model of the robot axis arrangement, wherein the dynamic variable comprises at least one of a force or a movement variable.

2. The method of claim 1, wherein at least one of the driving force or the braking force is controlled on the basis of a difference between the dynamic variable and a specified limit value.

3. The method of claim 1, wherein the braking force is applied on the basis of an operating exception.

4. The method of claim 1, wherein the brake includes a holding brake for locking the output link.

5. The method of claim 4, wherein the holding brake is a mechanical, hydraulic, or pneumatic holding brake.

6. The method of claim 1, wherein at least one of the drive or the brake is monitored with fail-safe technology.

7. The method of claim 1, wherein:
at least one of the dynamic variable or at least one control variable for controlling at least one of the driving force or the braking force is determined with fail-safe technology; or
at least one of the driving force or the braking force is controlled with fail-safe technology; or
at least one of the dynamic variable or at least one control variable for controlling at least one of the driving force or the braking force is determined with fail-safe technology, and at least one of the driving force or the braking force is controlled with fail-safe technology.

8. The method of claim 1, wherein the dynamic variable comprises a torque.

9. The method of claim 1, wherein the movement variable comprises an acceleration of the output link.

10. A non-transitory machine readable data medium storing a computer program product having programming code for decelerating a robot axis arrangement comprising at least one output link, the programming code configured to, when executed by a computer, cause the computer to:
apply a braking force on the output link with a brake during deceleration of the output link;
detect a dynamic variable of the output link using a force sensor operatively connected to the output link; and
control at least one of the braking force or a driving force of a drive that acts on the output link on the basis of the dynamic variable of the output link and a dynamic model of the robot axis arrangement, wherein the dynamic variable comprises at least one of a force or a movement variable.

11. A robot axis arrangement, comprising:
at least one output link;
a brake for applying a braking force on the output link;
a drive for applying a driving force on the output link;
a controller controlling at least one of the driving force or the braking force during deceleration of the output link, on the basis of a dynamic variable of the output link and a dynamic model of the robot axis arrangement; and a force sensor operatively connected to the output link for detecting the dynamic variable, the dynamic variable comprising at least one of a force or a movement variable.

12. The robot axis arrangement of claim 11, wherein the brake includes a holding brake for locking the output link.

13. The robot axis arrangement of claim 12, wherein the holding brake is a mechanical, hydraulic, or pneumatic holding brake.

14. The robot axis arrangement of claim 11, wherein at least one of the controller or the detection means is designed with fail-safe technology.

15. The robot axis arrangement of claim 11, wherein the controller is designed for controlling at least one of the driving force or the braking force of a single axis and is disposed in a robot link, in which at least one of the drive or the brake is disposed.

* * * * *

UNITED STATES PATENT AND TRADEMARK OFFICE
CERTIFICATE OF CORRECTION

PATENT NO. : 9,956,693 B2  
APPLICATION NO. : 14/339093  
DATED : May 1, 2018  
INVENTOR(S) : Hartmut Keyl et al.

It is certified that error appears in the above-identified patent and that said Letters Patent is hereby corrected as shown below:

In the Drawings

Delete drawing sheet 1 of 2, figs. 3-4C and substitute therefor the drawing sheet, consisting of figs. 1 and 2 as shown on the attached page.

Signed and Sealed this  
Fourth Day of December, 2018

Andrei Iancu  
*Director of the United States Patent and Trademark Office*